United States Patent
Brandt

(10) Patent No.: US 11,179,691 B1
(45) Date of Patent: Nov. 23, 2021

(54) DYNAMICALLY ADJUSTABLE CHEMICAL PROCESSING COLUMN

(71) Applicant: Asahi Kasei Bioprocess America, Inc., Glenview, IL (US)

(72) Inventor: Michael D. Brandt, Cassopolis, MI (US)

(73) Assignee: Asahi Kasei Bioprocess America, Inc., Glenview, IL (US)

( * ) Notice: Subject to any disclaimer, the term of this patent is extended or adjusted under 35 U.S.C. 154(b) by 0 days.

(21) Appl. No.: 16/991,880

(22) Filed: Aug. 12, 2020

(51) Int. Cl.
| | |
|---|---|
| *B01J 8/00* | (2006.01) |
| *B01J 8/02* | (2006.01) |
| *B01J 19/00* | (2006.01) |
| *B01J 19/18* | (2006.01) |

(52) U.S. Cl.
CPC ............ *B01J 8/0085* (2013.01); *B01J 8/025* (2013.01); *B01J 2208/00938* (2013.01); *B01J 2208/027* (2013.01)

(58) Field of Classification Search
CPC ... B01J 8/00; B01J 8/008; B01J 8/0085; B01J 8/02; B01J 8/0242; B01J 8/025; B01J 19/00; B01J 19/18; B01J 2208/00; B01J 2208/00796; B01J 2208/00938; B01J 2208/02; B01J 2208/023; B01J 2208/027
See application file for complete search history.

(56) References Cited

U.S. PATENT DOCUMENTS

| | | | |
|---|---|---|---|
| 6,843,918 B2 | 1/2005 | Hauck et al. | |
| 7,132,053 B2 | 11/2006 | Hauck et al. | |
| 7,267,765 B2 | 9/2007 | Hauck et al. | |
| 7,674,383 B2 * | 3/2010 | Rahn | B01D 15/206 210/656 |
| 2011/0259831 A1 | 10/2011 | Brandt et al. | |
| 2013/0213486 A1 | 8/2013 | Brandt | |
| 2019/0314741 A1 | 10/2019 | Brandt | |

* cited by examiner

*Primary Examiner* — Natasha E Young
(74) *Attorney, Agent, or Firm* — Marshall, Gerstein & Borun LLP

(57) ABSTRACT

A chemical processing column that includes a column base and an assembly for maintaining plug flow in the column base. The column base is adapted to contain a bed of media. The assembly includes a sleeve removably coupled to the column base, a plate coupled to the plate, and a piston at least partially disposed within the sleeve. The assembly is dynamically movable relative to the column base to adjust a position of the piston relative to the column base to compensate for a change in volume occupied by the bed of media.

20 Claims, 6 Drawing Sheets

DYNAMICALLY ADJUSTABLE CHEMICAL PROCESSING COLUMN

FIELD OF THE DISCLOSURE

The present disclosure generally relates to a chemical processing column and, more particularly, to a chemical processing column that is dynamically adjustable to maintain plug flow through the column.

BACKGROUND

Chemical processing columns (e.g., chromatography and synthesis columns) are used in various industrial processes to produce and purify a wide variety of chemical products. FIG. 1 illustrates an example of a known chemical processing column 50 that is used to produce and purify a wide variety of chemical products. The known chemical processing column 50 illustrated in FIG. 1 includes a base 54, a bed 56 of media 58 in the base 54, and a piston 62 having a flange 66 that is coupled to the base 54 via a plurality of threaded rods 70 and captured between a plurality of nuts 72. Ideally, the bed 56 should be as homogenous as possible, and the media 58 should fill as much of the processing volume of the column as possible. In operation, however, the volume occupied by the bed 56 often fluctuates (e.g., increases or decreases) due to settling, shrinking, or swelling of the media 58. This alteration of the volume occupied by the bed 56 can be caused by hydraulic forces, but also from alterations in pH, solvent concentrations, and/or salt concentrations.

It will be appreciated that swelling of the media 58 increases the volume occupied by the bed 56, which may cause the media 58 to plug up the piston 62, thereby interfering with the proper operation of the piston 62 and interrupting plug flow through the column 50. Swelling of the media 58 may also cause the media 58 to plug up the base 54, which similarly serves to interrupt plug flow through the column 50. However, in order to remove the media 58 from the base 54 or adjust the position of the piston 62 to ensure that this does not happen, the nuts 72 must be manually adjusted on the threaded rods 70, if not removed and re-inserted, which is not only time and labor intensive, but increases the risk of misalignment between the piston 62 and the base 54. Conversely, shrinkage of the media 58 decreases the volume occupied by the bed 56. Although this does not plug up the piston 62, the volume decrease does nonetheless interrupt plug flow through the column 50, as there is now too much space between the bed 56 and the piston 62. Likewise, in order to adjust the position of the piston 62 to ensure that this does not happen, one or more operators must manually adjust the nuts 72 on the threaded rods 70, which, as described above, is disadvantageous.

It will also be appreciated that the bed 56 of media 58 must be repacked or replaced from time to time. However, the piston 62 must first be entirely removed from the base 54 in order to eject or unpack the media 58 from the base 54. As discussed above, this requires that the nuts 72 be manually adjusted and the threaded bolts 70 be manually removed, which is time and labor intensive. Moreover, the weight and size of the threaded bolts 70 and the piston 62 pose a serious danger to the operators as the threaded bolts 70 and the piston 62 are removed and ultimately recoupled to the base 54. Further yet, removal of the piston 62 from the base 54 also causes hydraulic fluid that may be disposed on one side of the piston 62 to help pressure balance the piston 62 to spill out.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

Figure 1:
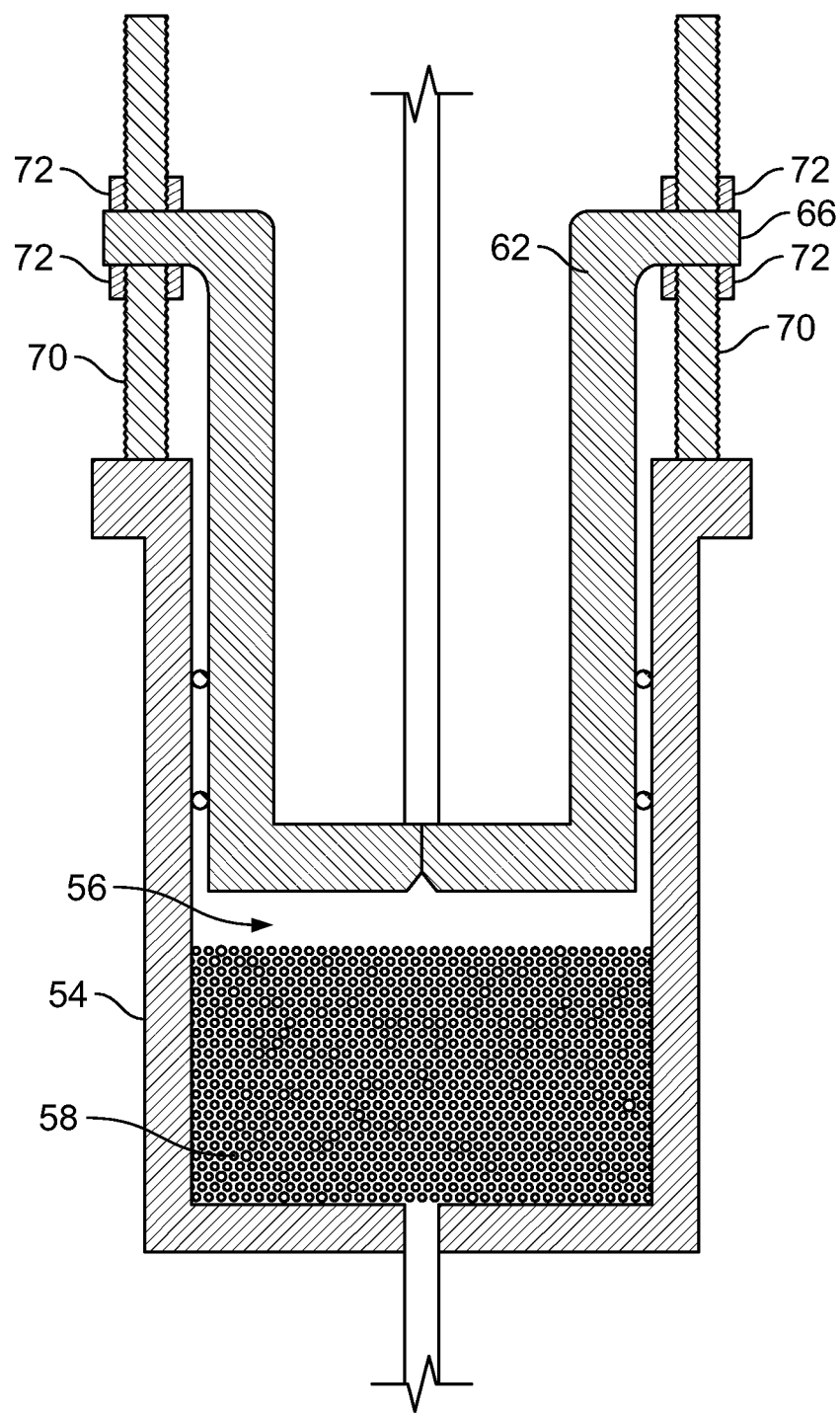
FIG. 1 is a cross-sectional view of an example of a known chemical processing column.

The present disclosure is directed to a chemical processing column that aims to mitigate, if not solve, the problems associated with the chemical processing column 50 described above and other known chemical processing columns. The chemical processing column is dynamically adjustable to compensate for changes (e.g., increases, decreases) in the volume occupied by a bed of media disposed therein due to settling, swelling, or shrinkage of the media. More particularly, the chemical processing column disclosed herein has a base and a piston that is dynamically adjustable relative to the base and the bed of media to compensate for such volume changes during operation of the chemical processing column. Thus, if, for example, the media swells during operation of the chemical processing column, the piston can be moved (e.g., away from the bed) to prevent the bed, which now occupies more volume in the base, from plugging up the piston. Beneficially, the piston is dynamically adjustable without having to manually adjust any bolts, thereby saving time and labor and reducing the risk of misalignment. Moreover, the piston can be removed from the base without any bolts having to be manually removed, thereby facilitating quick and easy maintenance of the piston. Removal of the piston in this manner also allows the bed of media to be easily removed and repacked or replaced without any bolts having to be manually removed and re-inserted. Further, the bed of media can be removed and repacked or replaced without losing any of the hydraulic fluid that may be disposed in the chemical processing column to help pressure-balance or move the piston.

FIGS. 2, 4, 5, and 6 illustrate an example of a chemical processing column 100 constructed in accordance with the teachings of the present disclosure. The chemical processing column 100 is configured for use in chemical synthesis processes. Thus, in this example, the chemical processing column 100 is part of a chemical processing system that includes components not illustrated in FIGS. 2, 4, 5, and 6. However, it will be appreciated that the chemical processing column 100 can instead be used in other processes, e.g., chromatography processes.

As illustrated in FIGS. 2, 4, 5, and 6, the chemical processing column 100 generally includes a column base 104 and an assembly 108 for maintaining plug flow in the column base 104. The column base 104 is adapted to contain a bed 110 of media 111, which in this example takes the form of beads. The assembly 108 includes a sleeve 112 removably coupled to the column base 104, a plate 116 coupled to the sleeve 112, and a piston 120 at least partially disposed within (i.e., surrounded by) the sleeve 112. As will be discussed in greater detail below, the assembly 108 (and more particularly the piston 120) is dynamically adjustable (e.g., movable), relative to the column base 104 and to the bed 110, to compensate for changes (e.g., increases, decreases) in the volume occupied by the bed 110 due to fluctuations (e.g., swelling, shrinkage) in the media 111. Moreover, the assembly 108 is movable, as a single unit, relative to the column base 104, to facilitate quick and easy maintenance of the piston 120 and to allow the bed 110 of media 111 to be removed and repacked or replaced without losing any of the hydraulic fluid used to help pressure-balance the piston 120.

The column base 104 in this example has a substantially cylindrical shape defined by an open top 124 having a flange 126, a bottom 128 opposite the top 124, and a cylindrical sidewall 132 extending between the open top 124 and the bottom 128. As such, an interior chamber 136 is partially defined by the top 124, the bottom 128, and the cylindrical sidewall 132. In other examples, however, the column base 104 can be alternatively shaped (e.g., the column base 104 can have a square planform shape that forms a rectangular prism).

Figure 2:
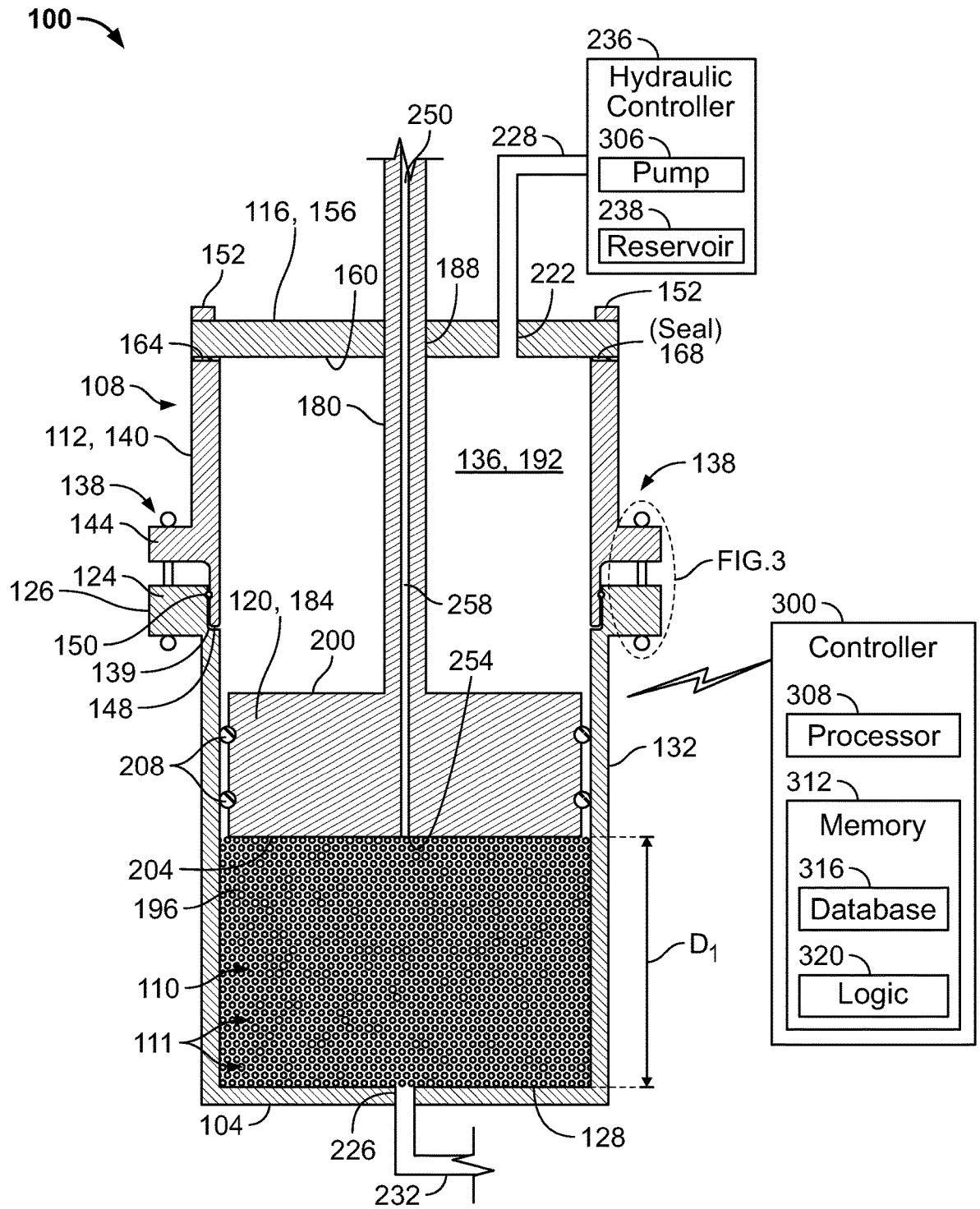
FIG. 2 is a cross-sectional view of an example of a dynamically adjustable chemical processing column constructed in accordance with the teachings of the present disclosure, the chemical processing column including a column base and an assembly in a first position relative to the column base.

The sleeve 112 is removably coupled to the column base 104, such that the sleeve 112 can be quickly and easily decoupled from the column base 104 (and recoupled to the column base 104). In this example, the sleeve 112 is removably coupled to the column base 104 via (i) a bottom end 148 of the sleeve 112 that is configured to be at least partially removably disposed in a groove 139 formed in the open top 124, and (ii) a plurality securing members 138. In other examples, however, the sleeve 112 can be coupled to the column base 104 in another manner. The sleeve 112 in this example takes the form of an annular sleeve 140 and a flange 144 extending outward (radially outward) proximate the bottom end 148 of the annular sleeve 140. As illustrated in FIG. 2, when the sleeve 112 is coupled to the column base 104, the flange 144 is immediately adjacent the flange 126 of the column base 104 and the bottom end 148, which in this example is narrower than the annular sleeve 140 and the flange 144, is at least partially disposed in the groove 139 of the column base 104. In this example, the flange 144 is separated from the flange 126 by the securing members 138, and a sealing element 150 (e.g., an O-ring) is carried by the sleeve 112 at or proximate the bottom end 148. Thus, the sealing element 150 is configured to be disposed between the flange 126 of the column base 104 and the bottom end 148 of the sleeve 112 to effect a seal between the column base 104 and the sleeve 112. In other examples, however, the flange 144 can directly engage the flange 126 and/or the sealing element 150 can be disposed elsewhere. In either case, the annular sleeve 140 and the flange 144 also partially define the interior chamber 136.

The plate 116 in this example is coupled to the sleeve 112 via a plurality of fasteners 152, such that the sleeve 112 is carried by the plate 116. In other examples, however, the plate 116 can be coupled to the sleeve 112 in another manner. For example, the plate 116 can be integrally formed with the sleeve 112. As another example, the plate 116 can removably seat against the sleeve 112. The plate 116 has a top surface 156 and a bottom surface 160 opposite the top surface 156. When the plate 116 is coupled to the sleeve 112, the bottom surface 160 of the plate 116 is immediately adjacent a top end 164 of the annular sleeve 140 opposite the bottom end 148. In this example, a sealing element 168 (e.g., an annular gasket) can be disposed between the bottom surface 160 of the plate 116 and the top end 164 of the annular sleeve 140 in order to effect a seal between the sleeve 112 and the plate 116. In other examples, however, the bottom surface 160 of the plate 116 can directly engage the top end 164 of the annular sleeve 140. In any event, when the sleeve 112 is coupled to the column base 104, the top surface 156 of the plate 116 faces outward, away from the bottom 128, and is exposed to atmosphere, whereas the bottom surface 160 of the plate 116 faces the bottom 128 and covers or encloses the interior chamber 136.

The piston 120 in this example includes a piston rod 180 and a piston head 184 coupled to (e.g., integrally formed with) the piston rod 180. The piston rod 180 extends through a central opening 188 formed in the plate 116, such that the piston 120 is at least partially disposed within (i.e., surrounded by) the sleeve 112 and the piston head 184 is disposed within the interior chamber 136. The piston head 184 will be disposed within the column base 104, within the sleeve 112, or partially disposed within both the column base 104 and the sleeve 112, depending upon the position of the piston 120 within the interior chamber 136. Either way, the piston head 184 divides the interior chamber 136 into a first interior sub-chamber 192 and a second interior sub-chamber 196 opposite the first interior sub-chamber 192. The first interior sub-chamber 192, which is defined adjacent a first side 200 of the piston head 184, is adapted to hold hydraulic fluid therein, so may alternatively be referred to herein as the hydraulic fluid chamber. The second interior sub-chamber 196 is defined adjacent a second side 204 of the piston head 184 opposite the first side 200. The bed 110 is disposed in the column base 104 (against the bottom 128) such that the media 111 are disposed or contained within the second interior sub-chamber 196 between the bottom 128 and the second side 204 of the piston head 168. The media 111 may be porous or non-porous and may include polymeric material or gel, including a base structure that is constructed from cellulose, methacrylate, divinyl benzene, silica, zeolite, titanium, or is of the type used in any other separation medium. In any event, the first interior sub-chamber 192 is fluidly isolated from the second interior sub-chamber 196 because the piston head 184 carries one or more sealing elements 208 arranged to sealingly engage an inner surface of the cylindrical sidewall 132 of the column base 104, an inner surface of the sleeve 112, or both, again depending on the position of the piston 120 within the interior chamber 136.

The chemical processing column 100 additionally includes a column inlet 222 and a column outlet 226. In this example, the column inlet 222 is formed in and through the plate 116 such that the column inlet 222 can fluidly connect a hydraulic controller 236 having a reservoir 238 of hydraulic fluid to the first interior sub-chamber 192 via conduit 228.

In turn, hydraulic fluid can be provided to or removed from the first interior sub-chamber 192 via the column inlet 222 and the conduit 228. Meanwhile, the column outlet 226 is, in this example, formed in the bottom 128 of the column base 104 such that the column outlet 226 can fluidly connect the second interior sub-chamber 196 to other components of the chemical processing system located downstream of the chemical processing column 100 via conduit 232. In turn, process fluid that has flowed through the chemical processing column 100 can flow out of the column base 104 and to the downstream components via the column outlet 226 and the conduit 232. In other examples, however, e.g., when it is desirable to have fluid flow in the opposite direction, the column inlet 222 and the column outlet 226 can be reversed, with the column inlet 222 formed in the bottom 128 of the column base 104 and the column outlet 226 formed in the plate 116.

The chemical processing column 100 further includes a piston inlet 250, a piston outlet 254, and a fluid passageway 258 between the piston inlet 250 and the piston outlet 254. In this example, the piston inlet 250 is carried by the piston rod 180, such that the piston inlet 250 is disposed at a position outside of the chemical processing column 100 (and more particularly outside the sleeve 112 and the column base 104). Moreover, in this example, the piston outlet 254 is carried by the piston head 184 at or along the second side 204 of the piston head 184. While not illustrated herein, the piston inlet 250 is fluidly connected to one or more supplies of process fluid (not shown), such that process fluid flows through the piston rod 180 and to the second side 204 of the piston head 184 via the piston inlet 250, the fluid passageway 258, and the piston outlet 254. In other examples, however, e.g., when it is desirable to have fluid flow in the opposite direction, the piston inlet 250 and the piston outlet 254 can be reversed, with the piston inlet 250 carried by the piston head 184 at or along the second side 204 and the piston outlet 254 carried by the piston rod 180.

Figure 3:
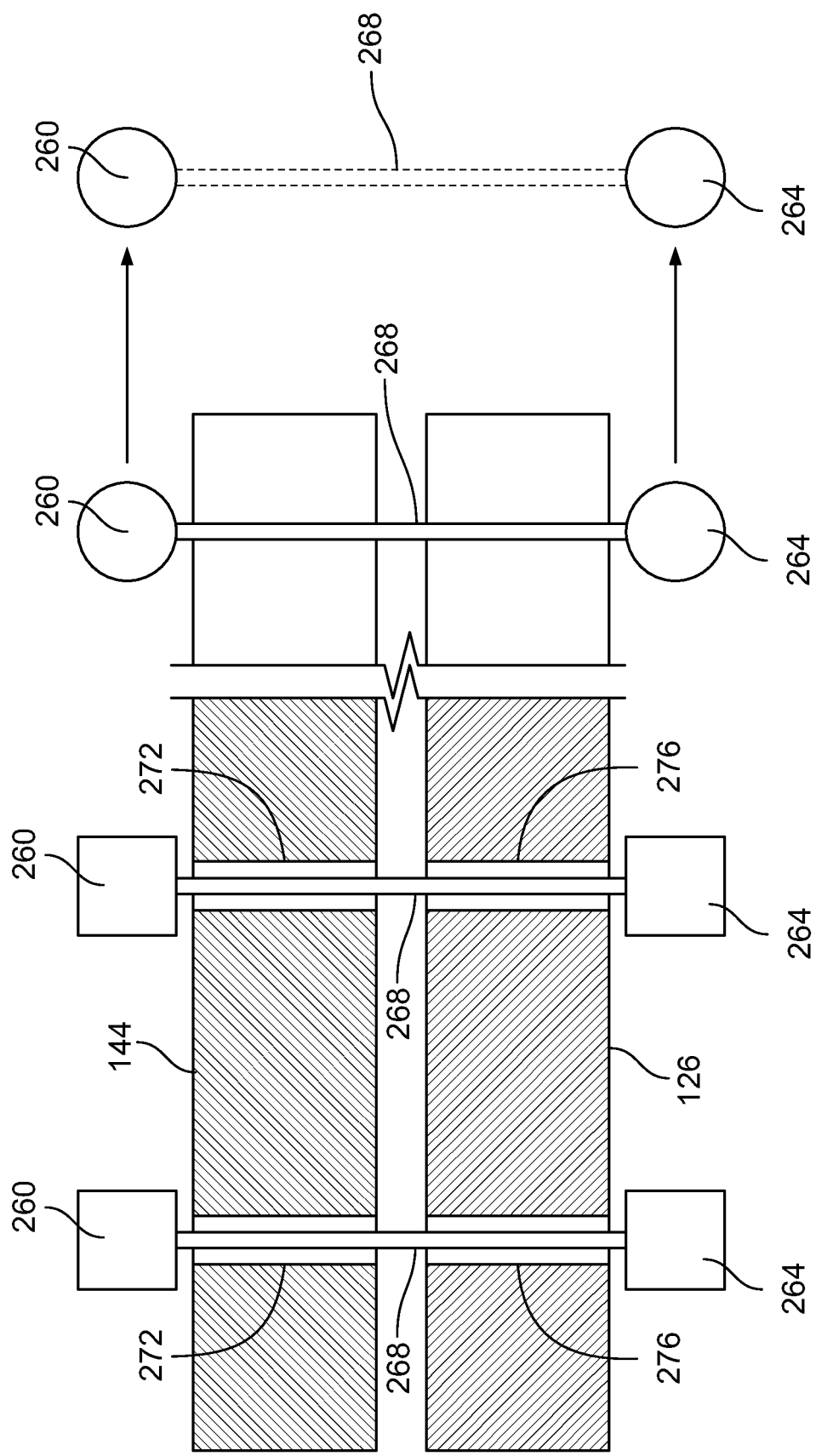
FIG. 3 is a close-up of a portion of the dynamically adjustable chemical processing column of FIG. 2, showing a plurality of pendulum members that removably couple a sleeve to a column base.

As discussed above, the sleeve 112 is removably coupled to the column base 104 via the plurality of securing members 138, which are coupled to both the column base 104 and the sleeve 112 at spaced radial positions about the circumference of the chemical processing column 100. As best illustrated in FIG. 3, each securing member 138 preferably takes the form of an I-bar having a proximal end 260 configured to be removably coupled to the sleeve 112, a distal end 264 configured to be removably coupled to the column base 104, and a stem 268 extending between and connecting the proximal end 260 and the distal end 264. The stem 268 of each securing member 138 is removably disposable within both a respective slot of a plurality of slots 272 formed in the flange 144 of the sleeve 112 and within a respective slot of a plurality of slots 276 formed in the flange 126 of the column base 104, such that the stem 268 of each securing member 138 extends through the respective slot 272 and the respective slot 276. In turn, the proximal end 260 of each securing member 138 is positioned above (at least when viewed in FIG. 3) the flange 144 of the sleeve 112 and the distal end 264 of each securing member 138 is positioned below (at least when viewed in FIG. 3) the flange 126 of the column base 104. And because the proximal end 260 of each securing member 138 is larger than the respective slot 272 and because the distal end 264 of each securing member 138 is larger than the respective slot 276, each securing member 138 is securely retained in place. In other examples, however, each securing member 138 can instead be fixedly coupled to the sleeve 112 (and removably coupled to the column base 104) or fixedly coupled to the column base 104 and removably coupled to the column base 104.

So configured, the securing members 138 are removably coupled to the column base 104 without having to use bolts. More particularly, it will be appreciated that the securing members 138 are movable between their locked positions, shown in solid lines in FIG. 3, and their storage positions, one of which is shown in dashed lines in FIG. 3, to removably couple the sleeve 112 to the column base 104. When the securing members 138 are in their locked positions, the stems 268 of the securing members 138 are disposed within and extend through the plurality of slots 272, respectively, and the plurality of slots 276, respectively, and, as discussed above, the shape and size of the proximal ends 260 and the distal ends 264 prevent the securing members 138 from translating in a direction parallel to a longitudinal axis 280 of the column 100. This, in turn, serves to lock the sleeve 112 in position relative to the column base 104. The securing members 138 can, however, be moved to their storage positions, off the chemical processing column 100, by pulling the securing members 138 in a direction perpendicular (or substantially perpendicular) to the longitudinal axis 280 until the stems 268 of the securing members 138 are pulled out of the plurality of slots 272, respectively, and the plurality of slots 276, respectively, and spaced away from the chemical processing column 100. In turn, the sleeve 112 (and the assembly 108 more generally) can be removed or decoupled from the column base 104.

The chemical processing column 100 can also include, or be connected to, a number of other components illustrated in FIGS. 2, 4, 5, and 6, namely the hydraulic controller 236 briefly discussed above, a controller 300, and a lifting device 304 (which may be part of the chemical processing column 100 or the chemical processing system in general). The hydraulic controller 236 is fluidly connected to the column inlet 222 and generally includes the reservoir 238 of hydraulic fluid as well as a hydraulic pump 306 that is configured to control delivery of the hydraulic fluid from the reservoir 238 to the column 100 (and vice-versa). The controller 300 is communicatively coupled (e.g., wirelessly coupled, coupled via one or more wired connections, or combinations thereof) to the chemical processing column 100 to control operation of the chemical processing column 100 (and the chemical processing system more generally) during the chemical synthesis process by transmitting signals (e.g., control signals, data) to and receiving signals (e.g., data) from the components of the chemical processing system. More particularly, the controller 300 is operatively coupled to the assembly 108 to dynamically control the position of the assembly 108 (and, more particularly, the piston 120). For example, the controller 300 is configured to dynamically adjust the position of the piston 120 to compensate for actual (i.e., past) or predicted changes in the volume occupied by the bed 110 due to swelling, shrinkage, or settling of the media 111. The controller 300 is also configured to cause the hydraulic controller 236 to direct hydraulic fluid into or out of the first interior sub-chamber 192 as needed to move the piston 120 (e.g., to force the piston 120 to compress the bed 110) or to pressure-balance the piston 120 and to cause process fluids (e.g., one or more solvents, reagents, washes, etc.) to flow into or out of the chemical processing column 100 as needed during the synthesis process. The lifting device 304 in this example takes the form of a hoist that is coupled to the assembly 108 to move the assembly 108 as a single unit relative to the column base 104. In this example, the hoist is directly coupled to the plate 116 and the piston 120 and, in turn, is indirectly coupled to the sleeve 112

(which is carried by the plate 116). In other examples, however, the hoist can be coupled to the assembly 108 (or a portion thereof) in a different manner.

Further, the chemical processing column 100 can also include, or be connected to, a number of other components not illustrated in FIGS. 2, 4, 5, and 6. The chemical processing column 100 can, for example, include or be connected to one or more valves (e.g., flow control valves, switching valves), one or more pressure regulators, one or more additional pumps (e.g., one or more process fluid pumps configured to control delivery of process fluid(s) to the column 100), one or more heat exchangers, and/or other components in order to facilitate the proper operation of the chemical processing column 100. The chemical processing column 100 can, for example, include or be connected to one or more property sensors (e.g., pressure sensors, flowmeters, conductivity sensors, pH sensors, UV sensors, temperature sensors, density sensors, optical sensors) operatively coupled to the chemical processing column 100 and arranged to provide feedback to the controller 300 during operation of the chemical processing column 100 (and the chemical processing system more generally) to ensure the proper operation of the chemical processing column 100. In some examples, the chemical processing column 100 can also include or be connected to any of the components discussed in U.S. patent application Ser. No. 15/954,562, filed Apr. 16, 2018 and titled "Chromatography and Synthesis Column Apparatus and Method of Assembly, which is hereby incorporated by reference in its entirety.

The controller 300 can be located immediately adjacent the chemical processing column 100 or can be remotely located from the chemical processing column 100. As illustrated in FIG. 2, the controller 300 includes a processor 308, a memory 312, a synthesis database 316, and computing logic 320. Though not depicted herein, these components are arranged in a known manner, but can be arranged in any manner.

The processor 308 may be a general processor, a digital signal processor, ASIC, field programmable gate array, graphics processing unit, analog circuit, digital circuit, or any other known or later developed processor. The processor 308 operates pursuant to instructions in the memory 312. The memory 312 may be a volatile memory or a non-volatile memory. The memory 312 may include one or more of a read-only memory (ROM), random-access memory (RAM), a flash memory, an electronic erasable program read-only memory (EEPROM), or other type of memory. The memory 312 may include an optical, magnetic (hard drive), or any other form of data storage device.

The synthesis database 316 is stored on the memory 312 and stores data about the chemical processing column 100 (and more generally the chemical processing system) and the chemical synthesis process(es) to be performed using the chemical processing column 100. More particularly, the synthesis database 316 generally stores data about (i) the media 111 employed in the chemical processing column 100, (ii) the process fluid(s) to be used during the chemical synthesis process(es), including the type(s) of process fluid (s) used and pre-determined typical or expected swell, shrinkage, and settle rates for the media 111 based on the type of process fluid used (e.g., switching from toluene to acetonitrile will cause the media 111 to contract), (iii) the hydraulic fluid(s) to be used during the chemical synthesis process(es), (iv) timing information for the chemical synthesis process(es), including pre-determined typical or expected times at which the process fluid(s) will be used during the chemical synthesis process(es) and/or at which the media 111 typically swells, shrinks, or settles (or is expected to do so). In some examples, the data stored in the synthesis database 316 is generated from previous chemical synthesis processes performed using the chemical processing column 100 or other chemical processing columns.

The logic 320 includes one or more routines and/or one or more sub-routines, embodied as computer-readable instructions stored on the memory 312. The processor 308 can execute the logic 320 to cause the processor 308 to perform actions related to the operation (e.g., control, adjustment) and/or maintenance of the chemical processing column 100 (and the chemical processing system in general), as will be described in greater detail below.

Finally, it will be appreciated that the above-described components of the chemical processing column 100 can be made from one or more different materials. In one example, the column base 104 and the assembly 108 can be made from one or more metal materials (e.g., stainless steel) while the conduit 228 and conduit 232 (and any other conduit used to connect components) can be made from a single-use or disposable material, such as a plastic material or polymer material or film material like gamma stable plastic (which can withstand gamma radiation).

FIGS. 2, 4, 5, and 6 will now be used to discuss the operation of the chemical processing column 100. In normal operation, i.e., when the chemical processing column 100 is used to perform a chemical synthesis (or other) process, process fluids (e.g., one or more solvents, one or more reagents, washes, etc.) are passed from the one or more supplies of process fluid (not shown) and into the column 100 via the piston inlet 250. Each process fluid then flows through the piston 120 (via the fluid passageway 258) and into the second interior sub-chamber 196 (via the piston outlet 254). That process fluid then flows through the second interior sub-chamber 196 and, more particularly, through voids formed between the media 111, before flowing out of the chemical processing column 100 via the column outlet 226. It will be appreciated that the same process fluid and/or different process fluid(s) may flow into, though, and out of the column 100 any number of times as needed to perform the chemical synthesis process. It will also be appreciated that the process fluid can flow through the column 100 in the opposite direction.

As process fluid flows through the chemical processing column 100 in this manner, the process fluid applies a flow pressure on the second side 204 of the piston head 184. The bed 110 also applies a bed pressure on the second side 204 of the piston head 184. The flow pressure and the bed pressure thus force the piston head 184 upward (at least when viewed in FIGS. 2, 4, and 5), toward the plate 116 and away from the bottom 128 of the column base 104. On the other hand, the hydraulic fluid in the first interior sub-chamber 192 applies a hydraulic pressure on the first side 200 of the piston head 184, thereby attempting to force the piston head 184 downward (at least when viewed in FIGS. 2, 4, and 5), toward the bottom 128 of the column base 104. In other words, the hydraulic pressure counters the flow pressure and the bed pressure, and when the hydraulic pressure is equal or substantially equal to the flow pressure and the bed pressure, the piston 120 is pressure-balanced in position during the chemical synthesis process. It will be appreciated, however, that in some examples, the piston 120 need not be pressure-balanced.

As discussed above, in normal operation the volume occupied by the bed 110 often fluctuates due to settling, shrinking, or swelling of the media 111 in the bed 110. The controller 300 is configured to detect or predict these fluctuations in the volume occupied by the bed 110 using data obtained from the synthesis database 316 and/or data obtained from one or more sensors (e.g. pressure sensors) operatively coupled to the chemical processing column 100. For example, the controller 300 is configured to predict that the volume occupied by the bed 110 will increase based on the type of process fluid flowing through the chemical processing column 100 (which may have a typical or expected swell, shrink, or settle rate associated therewith in the synthesis database 316) and/or based on the current point in time during the chemical synthesis process. As another example, the controller 300 is configured to detect that the volume occupied by the bed 110 has increased based on data obtained from one or more pressure sensors operatively coupled to the chemical processing column 100.

The controller 300 is configured to compensate for minor fluctuations in the volume occupied by the bed 110 by dynamically adjusting the position of the assembly 108 (e.g. the piston 120), the amount of hydraulic fluid in the first interior sub-chamber 192, one or other parameters, or combinations thereof. However, as also discussed above, at some point the volume occupied by the bed 110 may, for example, swell to the point that the media 111 plugs up the piston 120, thereby interfering with the proper operation of the piston 120 and preventing process fluid from flowing through the piston 120 (via the fluid passageway 258), i.e., thereby preventing plug flow. Conversely, at some point the volume occupied by the bed 110 may decrease to the point that there is too much space between the bed 110 and the piston 120, which also interferes with proper plug flow. Moreover, at some point it may be necessary to repack or replace the bed 110.

Figure 4:
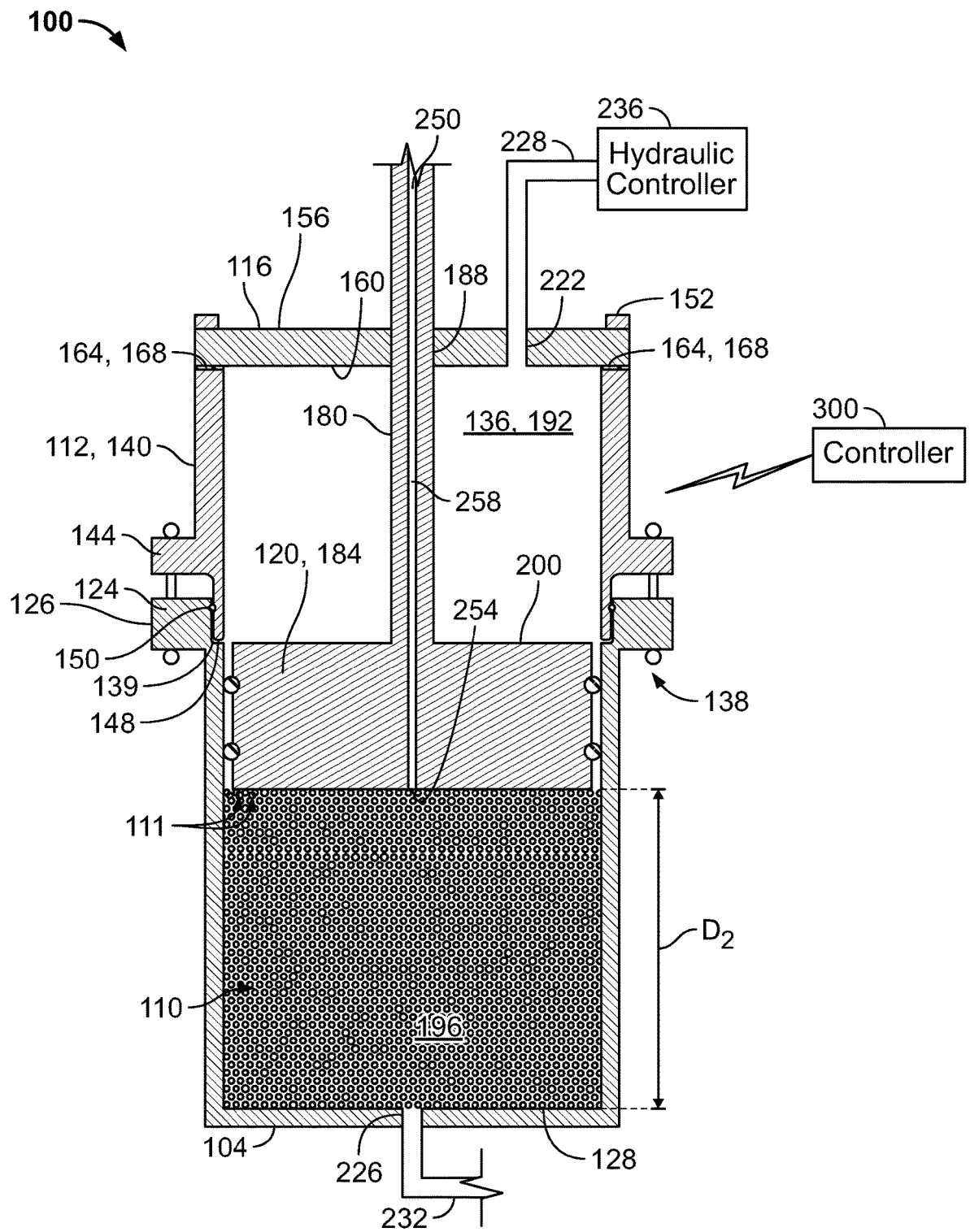
FIG. 4 is similar to FIG. 2, but shows the assembly moved to a second position relative to the column base to compensate for a change in volume occupied by a bed of media in the column base.

When, for example, the controller 300 determines that the volume occupied by the bed 110 has increased or will increase (due to swelling) such that the bed 110 is close to or in contact with the piston 120, the controller 300 is configured to adjust the assembly 108 so as to prevent the bed 110 from plugging up the piston 120. More particularly, the controller 300 causes the assembly 108 to move from a first, normal operating position, shown in FIG. 2, to a second, adjusted operating position, an example of which is shown in FIG. 4, to compensate for the increased volume occupied by the bed 110 and to prevent the media 111 from plugging up the piston 120. FIG. 2 illustrates that when the assembly 108 is in its first position, the sleeve 112 is coupled to the column base 104 and the piston 120 is wholly disposed in the interior chamber 136 at a first distance $D_1$ from the bottom 128 of the column base 104. FIG. 4 illustrates that when the assembly 108 is in the second position, the sleeve 112 is still coupled to the column base 104 and the piston 120 is wholly disposed in the interior chamber 136, but the piston 120 is disposed at a second distance $D_2$ from the bottom 128 of the column base 104, the second distance $D_2$ being greater than the first distance $D_1$ (in order to accommodate the increased volume occupied by the bed 110). It will be appreciated that the second position of the assembly 108, and in turn the second distance $D_2$, may vary from what is illustrated in FIG. 4, depending upon the degree to which the volume occupied by the bed 110 increases or will increase. It will also be appreciated that the assembly 108 is further dynamically movable from the second position shown in FIG. 4 to any number of different positions to compensate for additional swelling of the bed 110.

Figure 5:
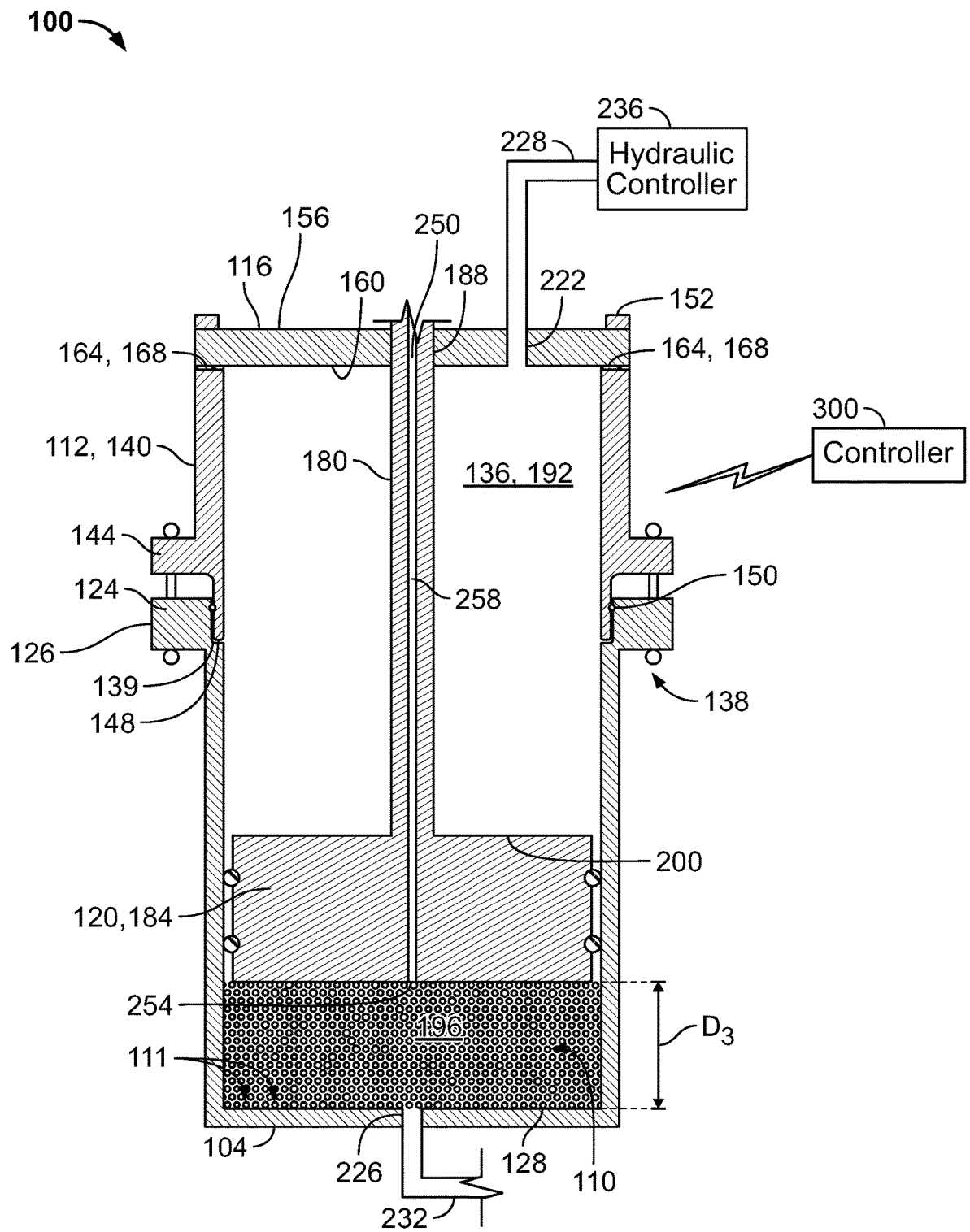
FIG. 5 is similar to FIG. 2, but shows the assembly moved to a third position relative to the column base to compensate for a change in volume occupied by a bed of media in the column base.

On the other hand, when the controller 300 determines that the volume occupied by the bed 110 has decreased or will decrease (due to shrinkage) such that the bed 110 is further from the piston 120 than desired, the controller 300 is configured to adjust the assembly 108 so as to maintain proper plug flow through the column 100. More particularly, the controller 300 causes the assembly 108 to move from the first, normal operating position, shown in FIG. 2, to a third, adjusted operating position, an example of which is shown in FIG. 5, to compensate for the decreased volume occupied by the bed 110. FIG. 5 illustrates that when the assembly 108 is in the third position, the sleeve 112 is still coupled to the column base 104 and the piston 120 is wholly disposed in the interior chamber 136, but the piston 120 is disposed at a third distance $D_3$ from the bottom 128 of the column base 104, the third distance $D_3$ being less than both the second distance $D_2$ and the first distance $D_1$ (in order to adjust to the decreased volume occupied by the bed 110). It will be appreciated that the third position of the assembly 108, and in turn the third distance $D_3$, may vary from what is illustrated in FIG. 5, depending upon the degree to which the volume occupied by the bed 110 decreases or will decrease. It will also be appreciated that the assembly 108 is further dynamically movable from the third position shown in FIG. 5 to any number of different positions to compensate for additional shrinkage of the bed 110.

Moreover, when the controller 300 or an operator of the chemical processing column 100 determines (e.g., based on the number of process fluids that have flowed through the chemical processing column 100) that the bed 110 of media 111 needs to be removed and repacked or replaced and/or that maintenance needs to be performed on the piston 120, the assembly 108 is movable, as a single unit, relative to the column base 104. Beneficially, the assembly 108 is so movable, and the bed 110 of media 111 can be removed and repacked or replaced and/or maintenance can be performed on the piston 120 without losing any of the hydraulic fluid in the hydraulic fluid chamber 192 used to help move or pressure-balance the piston 120. First, responsive to the determination that the bed 110 of media 111 needs to be removed and repacked or replaced and/or that maintenance needs to be performed on the piston 120, the sleeve 112 can be decoupled from the column base 104 by moving the securing members 138 from their locked positions (shown in solid lines in FIG. 3) to theft storage positions (shown in dashed lines in FIG. 3). Movement of the securing members 138 from their locked positions to their storage positions may be caused by the controller 300 or may be manually performed (e.g., by the operator of the column 100). In any event, the controller 300 can in turn cause the lifting device 300 to move the assembly 108 to a fourth position, shown in FIG. 6, by lifting the plate 112 and the piston 120 in an upward direction (at least when viewed in FIGS. 2, 4, 5, and 6), away from the column base 104 and away from the substrate bed 110, and ultimately out of the column base 104. As illustrated, in the third position, the sleeve 112, the plate 116, and the piston 120 are all removed from and wholly disposed outside of the column base 104, thereby exposing both the second side 204 of the piston head 184 and the interior chamber 136 (and in turn the bed 110). It will be appreciated that the assembly 108 can be recoupled to the column base 104 in a similar manner once the bed 110 has been repacked or replaced.

Figure 6:
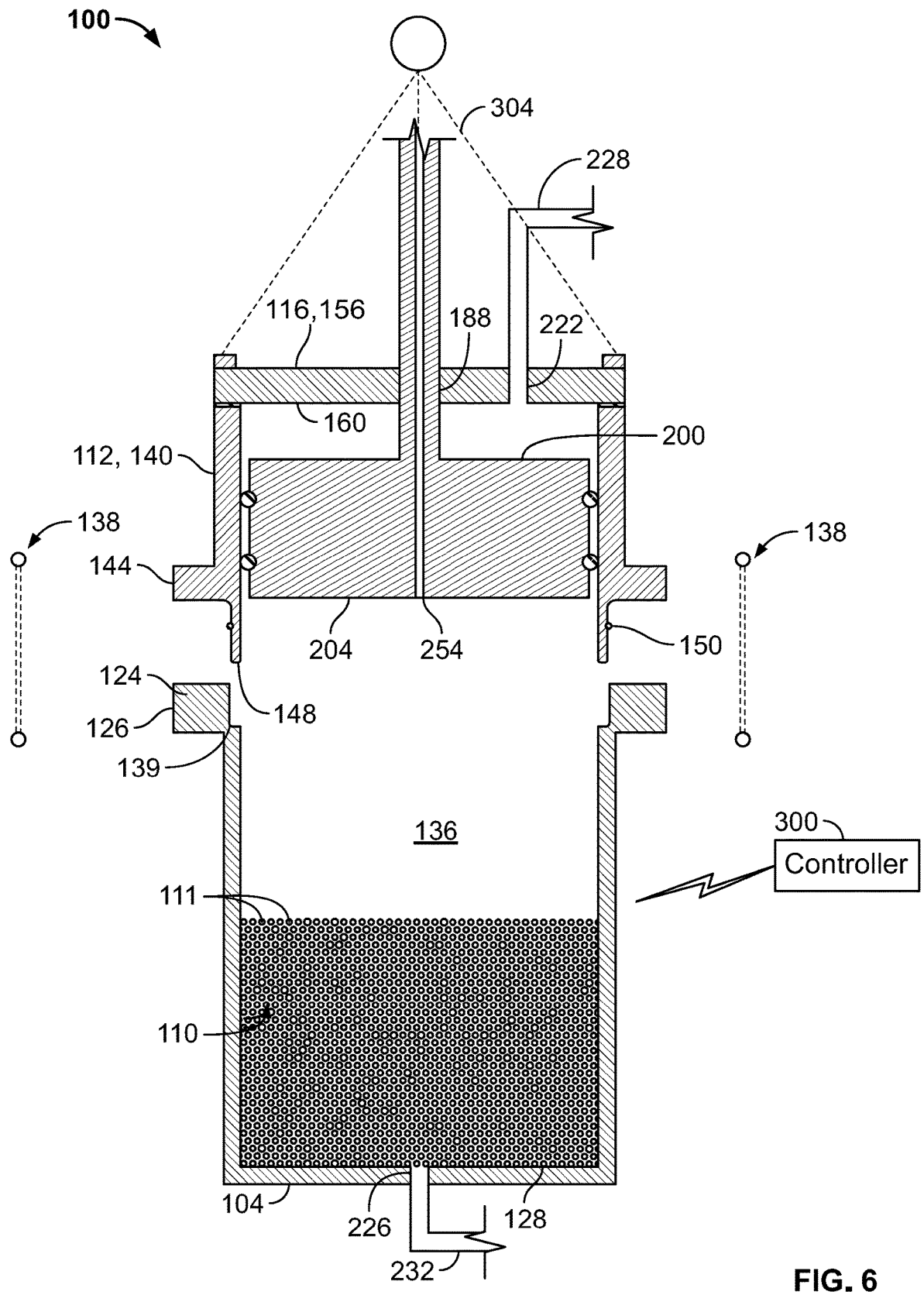
FIG. 6 is similar to FIG. 2, but shows the assembly moved to a fourth position relative to the column base to allow the bed of media to be removed.

Finally, and importantly, any hydraulic fluid contained in the first interior sub-chamber 192 (i.e., the hydraulic fluid chamber) is sealingly retained therein when the assembly 108 is in the first position shown in FIG. 2, the second position shown in FIG. 4, the third position shown in FIG. 5, the fourth position shown in FIG. 6, and any other positions, as well as during movement of the assembly 108 between any of these positions. Thus, the piston 120 can be dynamically adjusted and the bed 110 can be removed and repacked or replaced without losing any of the hydraulic fluid that would otherwise be lost.

Those skilled in the art will recognize that a wide variety of modifications, alterations, and combinations can be made with respect to the above described embodiments without departing from the scope of the disclosure, and that such modifications, alterations, and combinations are to be viewed as being within the ambit of the inventive concept.

The invention claimed is:

1. A dynamically adjustable processing column, comprising:
   a column base adapted to contain a bed of media; and
   an assembly for maintaining plug flow in the column base, the assembly comprising:
      a piston sleeve removably coupled to the column base;
      a plate coupled to the piston sleeve; and
      a piston at least partially disposed within the piston sleeve;
   wherein the assembly is dynamically adjustable relative to the column base to adjust a position of the piston relative to the bed of media in the column base to compensate for a change in volume occupied by the bed of media.

2. The processing column of claim 1, wherein the piston comprises a piston rod and a piston head coupled to the piston rod, the piston rod extending though a central opening formed in the plate, wherein the piston head is adjustable relative to the bed of media to compensate for the change in volume occupied by the bed of media.

3. The processing column of claim 1, wherein the piston sleeve is removably coupled to the column base via a plurality of securing members.

4. The processing column of claim 3, wherein each of the plurality of securing members comprises a proximal end coupled to the piston sleeve, a distal end removably coupled to the column base, and a stem extending between the proximal end and the distal end.

5. The processing column of claim 1, wherein the assembly further comprises a hydraulic fluid chamber defined between the plate, the piston sleeve, and the piston, the hydraulic fluid chamber adapted to hold hydraulic fluid therein.

6. The processing column of claim 5, wherein the hydraulic fluid chamber is adapted to hold hydraulic fluid therein when the assembly is in both the first position and the second position and when the assembly moves between the first position and the second position.

7. The processing column of claim 1, further comprising a controller operatively coupled to the plate to move the assembly to dynamically adjust the position of the piston relative to the substrate bed of particulate material in the column base.

8. The processing column of claim 1, wherein the assembly is movable between a first position, in which the piston is positioned a first distance from a bottom of the column base, and a second position, in which the piston is positioned a second distance from the bottom of the column base, the second position being different from the first position.

9. The processing column of claim 1, wherein the assembly is movable between a first position, in which the piston sleeve is coupled to the column base and the piston is at least partially disposed in the column base, and a second position, in which the piston sleeve is decoupled from the column base and the piston is disposed outside of the column base.

10. A dynamically adjustable processing column, comprising:
    a column base adapted to contain a bed of media;
    an assembly for maintaining plug flow in the column base, the assembly comprising:
       a piston sleeve removably coupled to the column base;
       a plate coupled to the piston sleeve; and
       a piston at least partially disposed within the piston sleeve,
    wherein the assembly is dynamically adjustable relative to the column base between a first position, in which the piston is positioned a first distance from a bottom of the column base, and a second position, in which the piston is positioned a second distance from the bottom of the column base that is different from the first distance, to compensate for a change in volume occupied by the bed of media, and
    wherein the assembly further comprises a hydraulic fluid chamber defined between the plate, the piston sleeve, and the piston, the hydraulic fluid chamber adapted to hold hydraulic fluid therein when the assembly is in both the first position and the second position and when the assembly moves between the first position and the second position.

11. The processing column of claim 10, wherein the piston sleeve is removably coupled to the column base via a plurality of securing members.

12. The processing column of claim 11, wherein each of the plurality of securing members comprises a proximal end coupled to the piston sleeve, a distal end removably coupled to the column base, and a stem extending between the proximal end and the distal end.

13. The processing column of claim 10, wherein the piston comprises a piston rod and a piston head coupled to the piston rod, the piston rod extending though a central opening formed in the plate, wherein the piston head is adjustable relative to the bed of media to compensate for the change in volume occupied by the bed of media.

14. The processing column of claim 13, wherein when the assembly is in the first position, the piston sleeve is coupled to the column base and the piston head is at least partially disposed in the column base at the first distance from the bottom of the column base, and when the assembly is in the second position, the plate is coupled to the column base and the piston head is at least partially disposed in the column base at the second distance from the bottom of the column base, the assembly movable relative to the column base to a third position in which the piston sleeve is decoupled from the column base and the piston head is disposed outside of the column base.

15. The processing column of claim 10, further comprising a controller operatively coupled to the plate to move the assembly to between the first position and the second position.

16. An assembly for maintaining plug flow in a dynamically adjustable processing column, the assembly comprising:
    a piston sleeve adapted to be removably coupled to a column base of the dynamically adjustable processing column;
    a plate coupled to the piston sleeve;
    a piston at least partially disposed within the piston sleeve,
    wherein the assembly is dynamically adjustable between a first position and a second position to compensate for a change in volume occupied by a bed of media in the column base.

17. The assembly of claim 16, further comprising a hydraulic fluid chamber defined between the plate, the piston sleeve, and the piston, the hydraulic fluid chamber adapted to hold hydraulic fluid therein when the assembly is in both the first position and the second position and when the assembly moves between the first position and the second position.

18. The assembly of claim 16, wherein the piston comprises a piston rod and a piston head coupled to the piston rod, the piston rod extending though a central opening formed in the piston sleeve.

19. The assembly of claim 16, further comprising a plurality of securing members adapted to removably couple the piston sleeve to the column base.

20. The assembly of claim 19, wherein each of the plurality of securing members comprises a proximal end adapted to be coupled to the piston sleeve, a distal end adapted to be removably coupled to the column base, and a stem extending between the proximal end and the distal end.

\* \* \* \* \*

UNITED STATES PATENT AND TRADEMARK OFFICE
CERTIFICATE OF CORRECTION

PATENT NO. : 11,179,691 B1
APPLICATION NO. : 16/991880
DATED : November 23, 2021
INVENTOR(S) : Michael D. Brandt Page 1 of 1

It is certified that error appears in the above-identified patent and that said Letters Patent is hereby corrected as shown below:

In the Claims

Column 11, Line 29, "extending though" should be -- extending through --.

Column 12, Line 35, "extending though" should be -- extending through --.

Column 12, Line 53, "assembly to between" should be -- assembly between --.

Column 13, Line 10, "extending though" should be -- extending through --.

Signed and Sealed this
Twenty-fourth Day of January, 2023

Katherine Kelly Vidal
*Director of the United States Patent and Trademark Office*